(12) United States Patent
Buyukkokten

(10) Patent No.: US 8,977,654 B1
(45) Date of Patent: Mar. 10, 2015

(54) ASSIGNING CLASSES TO USERS OF AN ONLINE COMMUNITY

(71) Applicant: Google Inc., Mountain View, CA (US)

(72) Inventor: Orkut Buyukkokten, Mountain View, CA (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 13/624,585

(22) Filed: Sep. 21, 2012

(51) Int. Cl.
G06F 17/30 (2006.01)
G06F 15/16 (2006.01)

(52) U.S. Cl.
CPC .... G06F 17/30867 (2013.01); G06F 17/30616 (2013.01)
USPC .......................................... 707/802; 709/207

(58) Field of Classification Search
None
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0210820 A1* | 10/2004 | Tarr et al. ...................... | 715/500 |
| 2004/0258220 A1 | 12/2004 | Levine et al. | |
| 2004/0267816 A1* | 12/2004 | Russek ...................... | 707/104.1 |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0111959 A1* | 5/2006 | Tarr et al. ...................... | 705/10 |
| 2006/0206604 A1 | 9/2006 | O'Neil et al. | |
| 2006/0271421 A1* | 11/2006 | Steneker et al. ................. | 705/9 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |

(Continued)

FOREIGN PATENT DOCUMENTS

WO    WO020079984    10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Tarek Chbouki
(74) *Attorney, Agent, or Firm* — Patent Law Works LLP

(57) ABSTRACT

This technology is directed to determining a character or personality characteristic for users of an online community, for example, a social network, and assigning a character or personality class to the users. In some instances, the systems and methods may determine the character or personality characteristic either implicitly from user data or actions etc., or explicitly, by providing users with a personality survey or questionnaire to solicit responses. The system and methods assign a suitable character or personality class to the users based on the character and personality characteristic determined for the users, and generate at least one of a class description, a career profile, and a relationship profile for the users, and provide data including the class description, career profile, and the relationship profile capable of being displayed on a user interface.

20 Claims, 11 Drawing Sheets

(56) References Cited

U.S. PATENT DOCUMENTS

| | | | |
|---|---|---|---|
| 2008/0056475 A1 | 3/2008 | Brannick et al. | |
| 2008/0140477 A1* | 6/2008 | Tevanian et al. | 705/7 |
| 2008/0192656 A1 | 8/2008 | Vagelos | |
| 2008/0294655 A1* | 11/2008 | Picault et al. | 707/100 |
| 2009/0265224 A1* | 10/2009 | Tarr et al. | 705/10 |
| 2011/0098156 A1 | 4/2011 | Ng et al. | |
| 2011/0218864 A1* | 9/2011 | Pentz et al. | 705/14.71 |
| 2012/0144316 A1* | 6/2012 | Deng et al. | 715/751 |
| 2012/0290660 A1* | 11/2012 | Rao et al. | 709/204 |
| 2012/0290979 A1* | 11/2012 | Devecka | 715/810 |
| 2013/0036112 A1* | 2/2013 | Poon | 707/723 |
| 2013/0086079 A1* | 4/2013 | Chaudhuri et al. | 707/748 |
| 2013/0086167 A1* | 4/2013 | Blom | 709/204 |
| 2013/0185285 A1* | 7/2013 | Shuman et al. | 707/722 |
| 2013/0262984 A1* | 10/2013 | Mehr et al. | 715/234 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

ASSIGNING CLASSES TO USERS OF AN ONLINE COMMUNITY

BACKGROUND

The present disclosure relates to assigning classes to users of an online community, for example, a social network. In particular, the present disclosure relates to assigning a character class to a user profile within a social network, based on determining a user's personality and generating career and relationship profiles.

In the last decade or so, social networks have become increasingly popular. Yet, users who belong to a social network are treated in similar and consistent ways. Social networks reflect real user identities and provide users with profiles that have a common format, configured with data fields for user data and pictures. People interact via social networks to socialize, advance their careers, maintain relationships, etc. There is no mechanism in social networks to distinguish users, for example, as in computer games having role playing, where players are distinguished based on capabilities (for example, mage, warrior, or healer), or race (human, orc, or elf). Yet, even in computer games, a character remains in the same class for its lifetime.

With the ongoing trends and exponential growth in social networking, it would certainly be beneficial to find ways to distinguish users depending on some criteria.

SUMMARY

The methods disclosed here include a computer-implemented method for assigning a character or personality class to one or more users of an online community, for example, a social network. The method includes determining, using at least one computing device, a character or personality characteristic for the one or more users. In some implementations, the method determines the character or personality characteristic by presenting a personality questionnaire to the one or more users of the online community and obtaining responses to the personality questionnaire from the one or more users. In some implementations, the method may determine the character or personality characteristic from user actions, behavior, or other user information. The method assigns the character or personality class to the one or more users, based at least in part on, the data determined or the responses obtained from the one or more users and generates a class description, based at least in part on, the character or personality class accorded to the one or more users. The method provides data including a class description, a career profile, or a relationship profile to a user interface for display.

The methods disclosed here may further include generating a career profile based at least in part on the responses to the questionnaire. In some instances, the career profile includes one or more employment recommendations. In some instances, the career profile includes an ideal working environment description. The methods may further include generating a relationship profile for at least two users, based at least in part on, responses obtained from the two users, wherein the relationship profile may include a compatibility score, a relationship description, or a list of common interests between the two users. The methods may generate a personality score for one or more personality variables, based in part on, the responses obtained from the one or more users to the questionnaire and wherein the personality class is assigned from a list of predetermined personality classes.

The system disclosed here assigns a character or personality class to one or more users of an online community, for example, a social network. The system comprises a processor; and a memory, wherein the processor and memory are communicatively coupled and further comprise a personality determination module configured to determine a character or personality characteristic for one or more users from multiple sources. In some instances, the source may be a personality questionnaire configured to obtain responses from the one or more users. The system includes a class assignment module configured to assign the character or personality class to the one or more users, based at least in part on, the responses obtained from the one or more users, a class description module configured to generate a class description, based at least in part on the personality class, and a user interface module configured to provide the class description to a user interface for display.

The system disclosed here may further include a career profile module configured to generate a career profile, based in part on, the character or personality class assigned or the responses obtained from users, wherein the career profile includes one or more employment recommendations or an ideal working environment description. The system may further include a relationship profile module configured to generate a relationship profile for at least two users, based in part on, responses obtained from the two users, wherein the relationship profile includes a compatibility score, a relationship description including a list of common interests for the two users etc. In some instances, the personality questionnaire module is further configured to generate a personality score for one or more personality variables, based in part on, the responses obtained from the one or more users.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
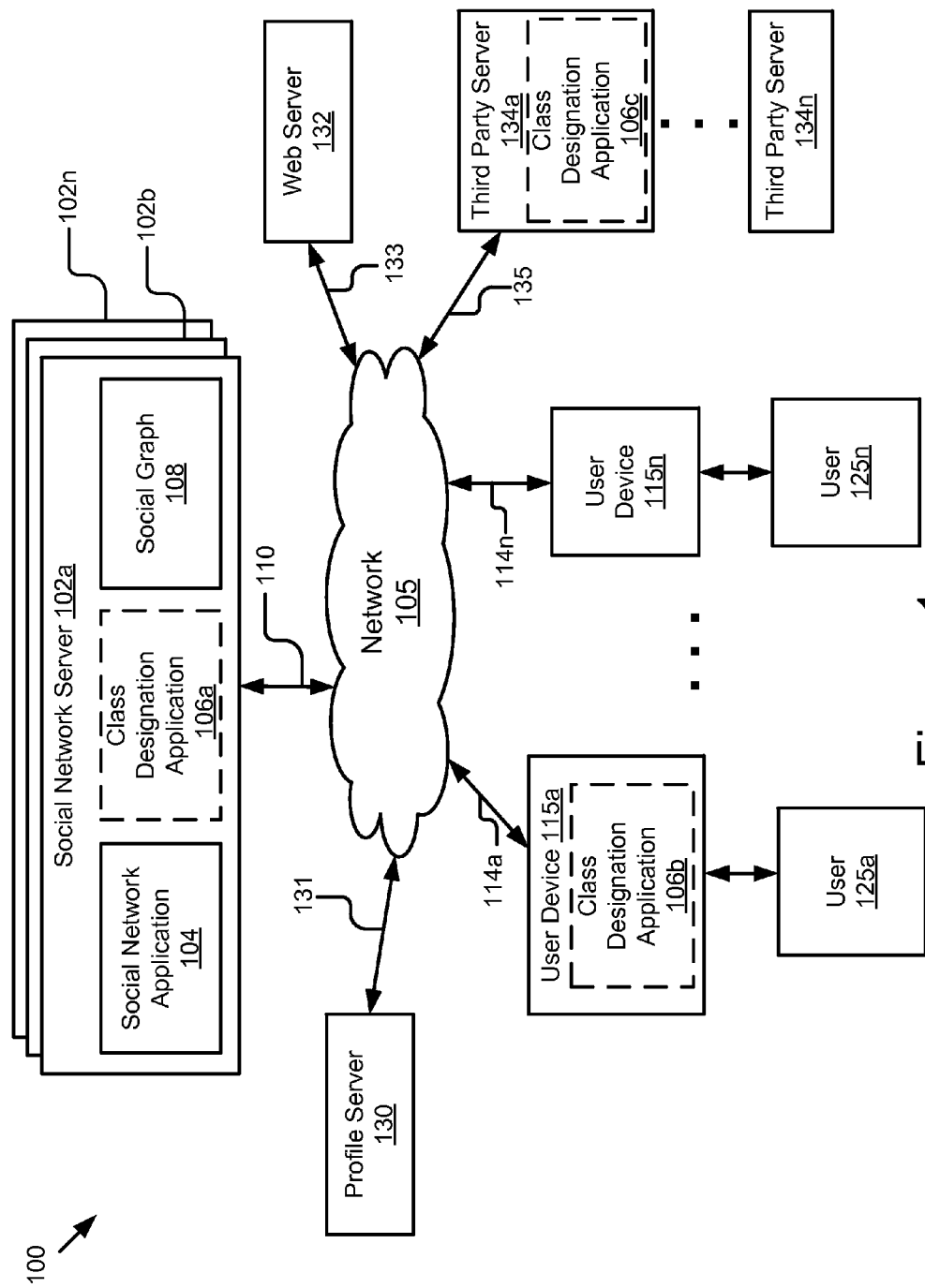
FIG. 1 is a block diagram illustrating an example system for assigning classes to user profiles of a social network including a class designation application.

In some embodiments, this technology includes systems and methods for assigning character classes to users of an online community, for example, a social network, based on the personality of the users. Specifically, this technology includes systems and methods for creating and/or retrieving a user profile within a social network and associating the user profile with a class formulated based on the personality of a user, which may be determined from user data, user actions, or a user's network of friends within the social network, or by providing a personality questionnaire, survey, or test to users. The classes indicate qualities and distinctive characteristics of users, which provide the systems and methods of this technology with detailed personality analysis, matching scores among users of a social network, and a compatibility analysis. Based on any of these criteria, the system and methods may recommend friends, activity partners, and romantic matches among users of a social network.

In some implementations, the system and methods develop an inventory of personality variables that establish a personality trait or characteristic by providing a personality questionnaire or survey to a user profile and soliciting responses. As one example, a question may be "I feel comfortable with myself," with multiple answer choices, including "Strongly Agree," "Agree," "Neutral," "Disagree," "Strongly Disagree." After the test questionnaire is administered, a numerical score may be assigned to each personality variable. Examples of personality variables may include sociability, affability, purposefulness, flexibility, and emotional outlook. The score assigned to a particular user for each personality variable may indicate where in the spectrum a user lies for a particular personality variable. In some examples, the spectrum for the personality type "sociability" may vary from "reserved" to "outgoing." In some examples, the spectrum for the personality type "flexibility" may vary between "conventional" and "creative." The system and methods may consider scores for each of the personality variables to determine and assign users to a particular class. As one example, the predetermined number of personality variables may be four. In some instances, a myriad of permutations and combinations with personality variables and other criteria (for example, age and gender) may be used to formulate or create classes. As one example, there may be sixteen classes, based on user age, gender, and personality variable test parameters. The system and methods may provide users with a detailed class description to inform users of their personality, behavior, and character. The classes may also provide users with important key concepts (for example, "outgoing," "enthusiastic" etc.) and a list of possible careers and jobs that have been categorized by career area. In some instances, the classes may inform users of career options (for example, "business," "education" etc.). In some instances, the system and methods may consider the classes and additional attributes of two users and provide compatibility indications in reports generated for users.

FIG. 1 is a high-level block diagram illustrating some embodiments of systems for assigning classes to user profiles. The system 100 illustrated in FIG. 1 provides system architecture for assigning personality classes to user profiles. The system 100 includes one or more social network servers 102a, 102b, through 102n, that may be accessed via user devices 115a through 115n, which are used by users 125a through 125n, to connect to any one of the social network servers 102a, 102b, through 102n. These entities are communicatively coupled via a network 105.

It should be recognized that whereas the present disclosure is described below primarily in the context of providing a framework for assigning social classes to user profiles, the present disclosure may be applicable to other situations where assigning classes for any purpose that is not related to social networks is necessary or desired. For ease of understanding and brevity, the description the present disclosure is described in the context of assigning social classes to user profiles within a social network.

The user devices 115a through 115n in FIG. 1 are illustrated as examples. Although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, the social network servers, 102a-102n, the profile server 130, the web server 132, and third party servers 134a through 134n, in practice, any number of networks 105 may be connected to these entities. In addition, although only two third party servers 134a through 134n are shown, the system 100 may include any number of third party servers 134n.

In some embodiments, the social network server 102a is coupled to the network 105, via a signal line 110. The social network server 102a includes a social network application 104, which includes the software routines and instructions to operate the social network server 102a and its functions and operations. Although only one social network server 102a is described here, multiple servers may be present, as illustrated by social network servers 102b through 102n, each with functionality similar to social network server 102a or different.

The term "social network" as used here includes, but is not limited to, any type of social structure where the users are connected by a common feature or link. The common feature includes relationships/connections, e.g., friendship, family, work, a similar interest, etc. The common features are provided by one or more social networking systems, for example, those included in the system 100, including explicitly-defined relationships and relationships implied by social connections with other online users, where the relationships form the social graph 108.

The term "social graph" as used here includes, but is not limited to, a set of online relationships between users, for example, provided by one or more social networking systems, for example, the social network system 100, including explicitly-defined relationships and relationships implied by social connections with other online users, where the relationships form a social graph 108. In some examples, the social graph 108 may reflect a mapping of these users and how they are related.

It should be understood that the social network server 102a and the social network application 104 are representative of a single social network. Each of the plurality of social network servers 102a, 102b through 102n, is coupled to the network 105, each having its own server, application, and social graph. For example, a first social network hosted on a social network server 102a may be directed to business networking, a second on a social network server 102b directed to or centered on academics, a third on a social network server 102c (not separately indicated in FIG. 1) directed to local business, a fourth on a social network server 102d (not separately indicated in FIG. 1) directed to dating, and yet others on social network server (102n) directed to other general interests or perhaps a specific focus.

A profile server 130 is illustrated as a stand-alone server in FIG. 1. In other embodiments of the system 100, all or part of the profile server 130, may be part of the social network server 102a. The profile server 130 is connected to the network 105, via a line 131. The profile server 130 has profiles for all the users that belong to a particular social network 102a-102n. One or more third party servers 134a through 134n are connected to the network 105, via signal line 135. A web server 132 is connected, via line 133, to the network 105.

The social network server 102a includes a class designation application 106a, to which user devices 115a through 115n are coupled via the network 105. In particular, user device 115a is coupled, via line 114a, to the network 105. The user 125a interacts via the user device 115a to access the class designation application 106 to either participate in a personality questionnaire or receive a class designation that is provided for display to the user. The class designation application 106 or certain components of it may be stored in a distributed architecture in any of the social network server 102, the third party server 134, and the user device 115. In other embodiments, the class designation application 106 may be included, either partially or entirely, in any one or more of the social network server 102, the third party server 134, and the user device 115.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 may be of conventional type, wired or wireless, and may have any number of configurations for example a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105 may be a peer-to-peer network. The network 105 may also be coupled to or include portions of one or more telecommunications networks for sending data in a variety of different communication protocols.

In yet another embodiment, the network 105 includes Bluetooth communication networks or a cellular communications network for sending and receiving data for example via short messaging service (SMS), multimedia messaging service (MMS), hypertext transfer protocol (HTTP), direct data connection, WAP, email, etc.

In some embodiments, the social network servers, 102a-102n, the profile server 130, the web server 132, and the third party servers 134a through 134n may be hardware servers including a processor, memory, and network communication capabilities. One or more of the users 125a through 125n may access any of the social network servers 102a through 102n, via browsers in their user devices and via the web server 132.

Figure 2:
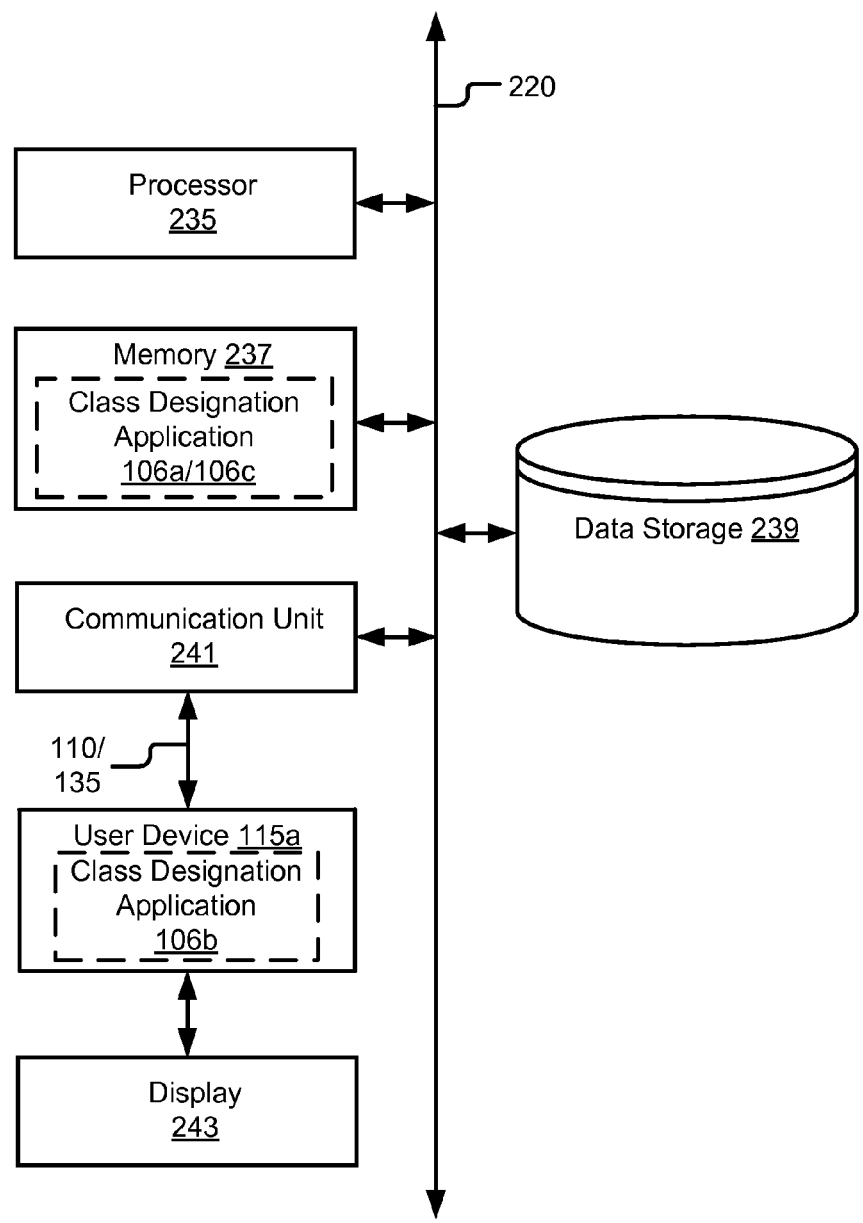
FIG. 2 is a block diagram illustrating example hardware components in some implementations of the example system shown in FIG. 1.

FIG. 2 is a block diagram illustrating some embodiments of a social network server 102 (a through n) and the third party server 134 (a through n). In FIG. 2, like reference numerals have been used to reference like components with the same or similar functionality that has been described above with reference to FIG. 1. As those components have been described above, that description is not repeated here. Either or both of the social network server 102 and the third party server generally include one or more processors, although only one processor 235 is illustrated in FIG. 2. The processor is coupled, via a bus 220, to memory 237 and data storage 239, which store information relating to personality questionnaires and/or class information, received from any of the other sources identified above. In some embodiments, the data storage 239 may be a database organized by the social network server 102a. In some embodiments, the class designation application 106 (a, c) may be stored in the memory 237.

A user 125a, via a user device 115a, either participates in a personality questionnaire (survey or test) or receives a class designation, via communication unit 241. In some embodiments, the user device is communicatively coupled to a display 243 to display information to the user. The class designation application 106a and 106c may reside, in their entirety or parts of them, in the user's device (115a through 115n), in the social network server 102a (through 102n), or otherwise, in a separate server, for example, the third party server 134 (FIG. 1). The user device 115a communicates with the social network server 102a, using the communication unit 241, via signal line 110.

Figure 3:
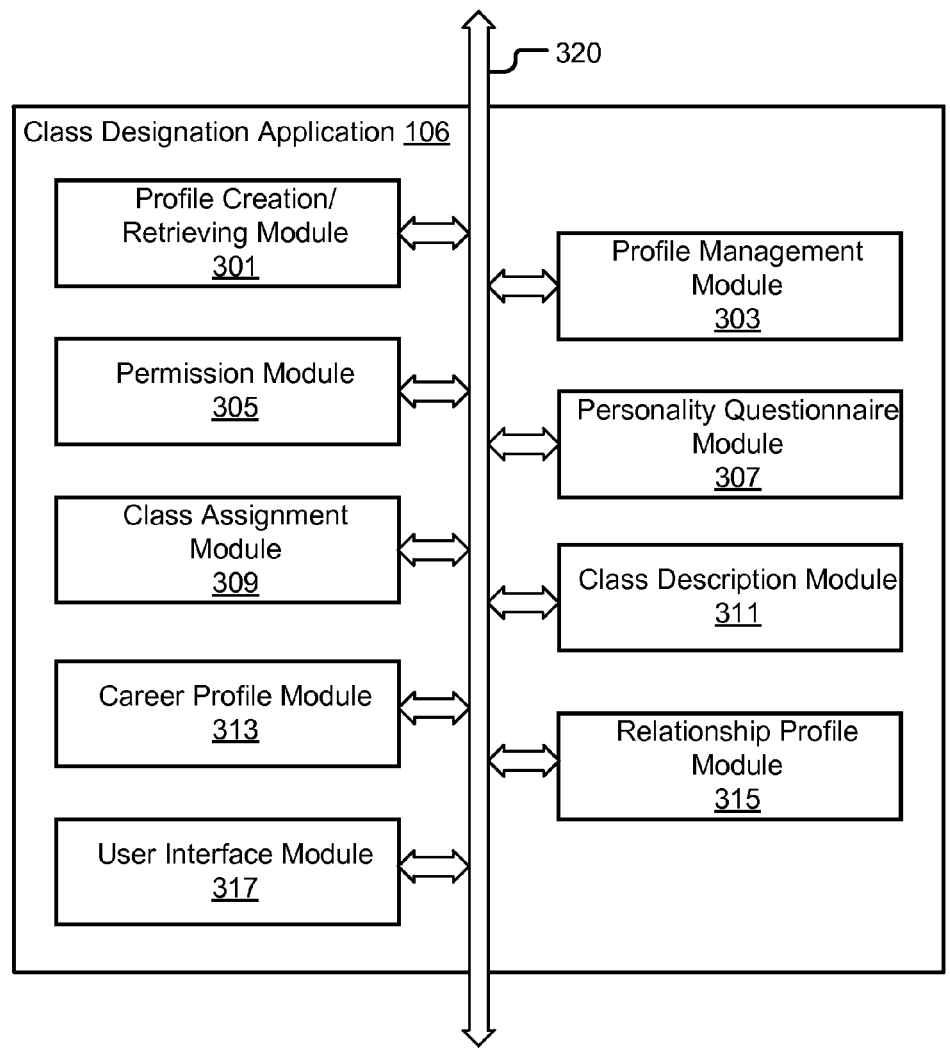
FIG. 3 is a block diagram illustrating an example class designation application and its software components.

Referring now to FIG. 3, like reference numerals have been used to reference like components with the same or similar functionality that has been described above with reference to FIGS. 1 and 2. As those components have been described above that description is not repeated here. The class designation application 106, indicated here by reference numeral 300, include various modules or engines that are programmed to perform the functionalities described here. A profile creation/retrieving module 301 is configured for creating and/or receiving one or more user profiles from a social network. A profile management module 303 manages the one or more social profiles. A permission module 305 determines user permissions for viewing and/or editing content. A personality questionnaire module 307 generates and provides a personality questionnaire to one or more users of a social network. A class assignment module 309 assigns a personality class to one or more user profiles. A class description module 311 generates a class description based on the assigned personality class. A career profile module 313 generates a career profile for a user based on the assigned personality class. A relationship profile module 315 generates a relationship profile for a user based on the assigned personality class. A user interface module 317 generates a user interface for displaying information relating to a personality class.

The class designation application 106 includes applications or engines that communicate over the software communication mechanism 320. Software communication mechanism 320 may be an object bus (for example CORBA), direct socket communication (for example TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, for example a network, the Internet, a bus 220 (FIG. 2), a combination thereof, etc.

The profile creation/retrieving module 301 may be software including routines for creating one or more user profiles. In some embodiments, the profile creation/retrieving module 301 may be a set of instructions executable by the processor 235 to provide the functionality described below for creating and/or receiving one or more user profiles from a social network. In other embodiments, the profile creation/retrieving module 301 may be stored in the memory 237 (FIG. 2) of the social network server 102 and/or the third party server 134 and may be accessible and executable by the processor 235. In either embodiment, the profile creation/retrieving module 301 can be adapted for cooperation and communication with the processor 235, the communication unit 241, data storage 239 and other components of the social network server 102 and/or the third party server 134 via the bus 220.

In some embodiments, the profile creation/retrieving module 301 generates one or more user profiles for a social network by receiving information (e.g., name, birthdate, occupation, employer, education, gender, email, phone number, street address, posts, photos, videos, etc.) from a user and storing the information in a social network database (e.g., data storage 239). In other embodiments, the profile creation/retrieving module 301 retrieves existing user profiles and/or information from the social network database (e.g., data storage 239).

The profile management module 303 may be software including routines for managing one or more social profiles. In some embodiments, the profile management module 303 can be a set of instructions executable by the processor 235 to provide the functionality described below for managing one or more social profiles within a social network. In other embodiments, the profile management module 303 may be stored in the memory 237 of the social network server 102 and/or the third party server 134 and may be accessible and executable by the processor 235. In either embodiment, the profile management module 303 can be adapted for cooperation and communication with the processor 235, the communication unit 241, data storage 239 and other components of the social network server 102 and/or the third party server 134 via the bus 220.

In some embodiments, the profile management module 303 may either delete and/or or modify information relating to a user profile (e.g., name, birthdate, occupation, employer, education, gender, email, phone number, street address, posts, photos, videos, etc.). In other embodiments, the profile management module 303 interacts with the social network server (e.g., responds to comments, posts, event requests, etc.).

The permission module 305 may be software including routines for determining user permissions. In some embodiments, the permission module 305 can be a set of instructions executable by the processor 235 to provide the functionality described below for determining user permissions for viewing and/or editing content. In other embodiments, the permission module 305 can be stored in the memory 237 of the social network server 102 and/or the third party server 134 and can be accessible and executable by the processor 235. In either embodiment, the permission module 305 can be adapted for cooperation and communication with the processor 235, the communication unit 241, data storage 239 and other components of the social network server 102 and/or the third party server 134, via the bus 220.

In some embodiments, the permission module 305 determines user permissions (to maintain user privacy) by receiving information from the social network server 102*a* and/or user profile and determining whether the user has the required permission to view and/or edit data within the social network server 102*a*. For example, the permission module 305 uses the social graph 108 to determine that a user may view a friend's class information.

The personality questionnaire module 307 may be software including routines for generating a personality questionnaire. In some embodiments, the personality questionnaire module 307 may be a set of instructions executable by the processor 235 to provide the functionality described below for generating and providing a personality questionnaire to one or more users of a social network. In other embodiments, the personality questionnaire module 307 can be stored in the memory 237 of the social network server 102 and/or the third party server 134 and can be accessible and executable by the processor 235. In either embodiment, the personality questionnaire module 307 can be adapted for cooperation and communication with the processor 235, the communication unit 241, data storage 239 and other components of the social network server 102 and/or the third party server 134 via the bus 220.

In some embodiments, the personality questionnaire module 307 generates a personality questionnaire (survey or test) and provides the questionnaire to one or more users of a social network via a user interface. The personality questionnaire module 307 then receives input or responses (from the user) and determines a personality score in one or more social categories (e.g., sociability, affability, purposefulness, flexibility/emotional outlook, etc.). Any number of social categories or personality variables may be used. In some embodiments, this information is stored on the social network 102*a* (e.g., data storage 239).

The class assignment module 309 may be software including routines for assigning a personality class. In some embodiments, the class assignment module 309 can be a set of instructions executable by the processor 235 to provide the functionality described below for assigning a personality class to one or more user profiles. In other embodiments, the class assignment module 309 can be stored in the memory 237 of the social network server 102 and/or the third party server 134 and can be accessible and executable by the processor 235. In either embodiment, the class assignment module 309 can be adapted for cooperation and communication with the processor 235, the communication unit 241, data storage 239, and other components of the social network server 102 and/or the third party server 134 via the bus 220.

In some embodiments, the class assignment module 309 receives personality information from the personality questionnaire module 307 and generates a personality class for a particular user based on the personality information. For example, the personality information may describe a user as "outgoing" and "friendly," and the class assignment module 309 may assign a "Shapeshifter" class to the user's profile. In other embodiments, the class assignment module 309 may assign any of a predetermined number of personality classes or types to the particular user.

The class description module 311 may be software including routines for generating a class description. In some embodiments, the class description module 311 can be a set of instructions executable by the processor 235 to provide the functionality described below for generating a class description based on the personality class. In other embodiments, the class description module 311 can be stored in the memory 237 of the social network server 102 and/or the third party server 134 and can be accessible and executable by the processor 235. In either embodiment, the class description module 311 can be adapted for cooperation and communication with the processor 235, the communication unit 241, data storage 239 and other components of the social network server 102 and/or the third party server 134 via the bus 220.

In some embodiments, the class description module 311 generates a class description for the one or more classes. For example, the class description module 311 generates an Elementalist class description including a summary, strengths and weaknesses, outlook, etc.

The career profile module 313 may be software including routines for generating a career profile. In some embodiments, the career profile module 313 can be a set of instructions executable by the processor 235 to provide the functionality described below for generating a career profile for a user based on the assigned personality class. In other embodiments, the career profile module 313 can be stored in the memory 237 of the social network server 102 and/or the third party server 134 and can be accessible and executable by the processor 235. In either embodiment, the career profile module 313 can be adapted for cooperation and communication with the processor 235, the communication unit 241, data storage 239 and other components of the social network server 102 and/or the third party server 134 via the bus 220.

In some embodiments, the career profile module 313 generates a career profile for a user profile based on one or more of the personality questionnaire, an assigned class, and user information. For example, the career profile module 313 may generate a career profile including one or more of career prospects, personality information, ideal working environment, etc.

The relationship profile module 315 may be software including routines for generating a relationship profile. In some embodiments, the relationship profile module 315 can be a set of instructions executable by the processor 235 to provide the functionality described below for generating a relationship profile for a user based on the assigned personality class. In other embodiments, the relationship profile module 315 can be stored in the memory 237 of the social network server 102 and/or the third party server 134 and can be accessible and executable by the processor 235. In either embodiment, the relationship profile module 315 can be adapted for cooperation and communication with the processor 235, the communication unit 241, data storage 239 and other components of the social network server 102 and/or the third party server 134, via the bus 220.

In some embodiments, relationship profile module 315 may generate a relationship profile for one or more users based on one or more of personality questionnaires, assigned classes, and user information. For example, the relationship profile module 315 may generate a relationship profile including one or more of user profiles and their corresponding personality classes, a compatibility score, user description, etc. In some embodiments, the relationship profile module 315 generates the compatibility score based on the similarities between the personality questionnaire answers and/or other user information. In other embodiments, the relationship profile module 315 may generate a list of similar interests between the one or more users.

The user interface module 317 may be software including routines for generating a user interface. In some embodiments, the user interface module 317 can be a set of instructions executable by the processor 235 to provide the functionality described below for generating a user interface for displaying information relating to a personality class. In other embodiments, the user interface module 317 can be stored in the memory 237 of the social network server 102 and/or the third party server 134 and can be accessible and executable by the processor 235. In either embodiment, the user interface module 317 can be adapted for cooperation and communication with the processor 235, the communication unit 241, data storage 239, and other components of the social network server 102 and/or the third party server 134 via the bus 220.

In some embodiments, the user interface module 317 may generate a user interface for displaying information received from one or more modules described above in the class designation application 106. For example, the user interface module 317 may generate one or more user interfaces for displaying a personality questionnaire, a career profile, a class description, a relationship profile, etc.

Figure 4:
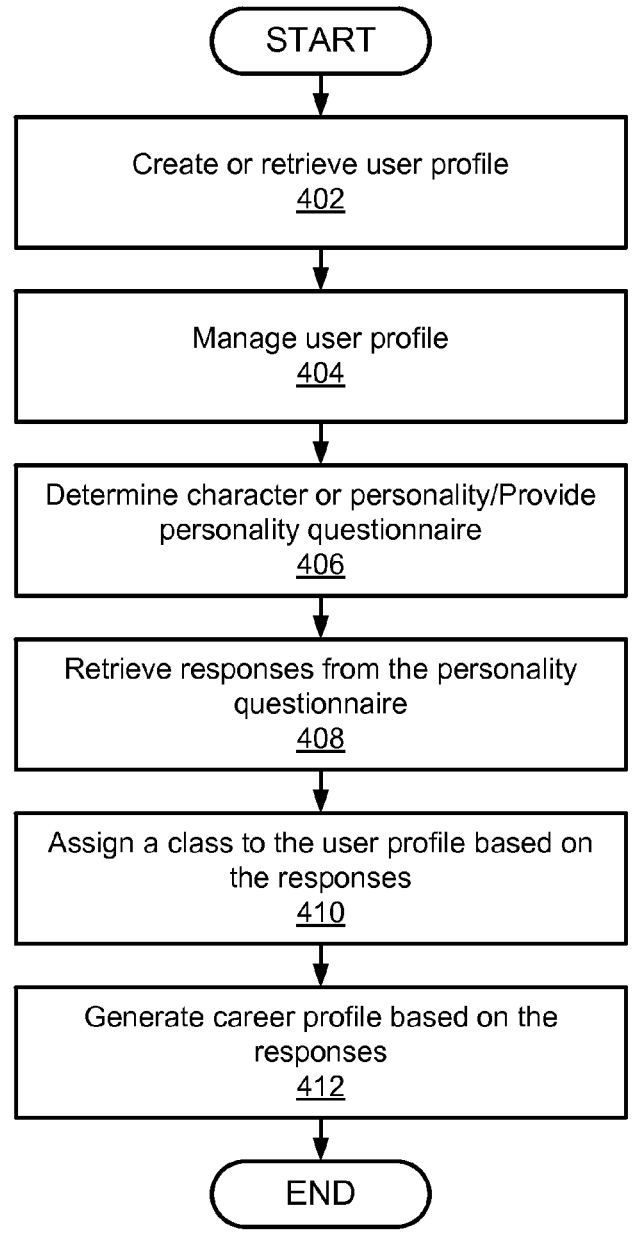
FIG. 4 is a flowchart of an example method for assigning a class to a user profile and generating a career profile.

FIG. 4 is a flow chart illustrating an example of a general method 400 for assigning a class to a user profile and generating a career profile. It should be understood that the order of the steps in FIG. 4 is merely by way of example and may be performed in different orders than those that are illustrated and some steps may be excluded, and different combinations of the steps may be performed. In the method illustrated, one or more operations of the method 400 begin with creating and/or receiving a user profile, as illustrated by block 402.

The method proceeds to the next block 404, at which stage, one or more operations of the method 400 manage the user profile (e.g., edits, responses to friend requests, responses to comments, etc.). The method 400 then proceeds to the next block 406, at which stage, one or more operations of the method 400 determine a character or personality characteristic for users, for example, either implicitly from user actions, behavior etc., or explicitly by providing a personality questionnaire (survey or test) for display to the user. The method 400 then proceeds to the next block 408, at which stage, one or more operations of the method 400 receive or retrieve responses from the personality questionnaire in the event a personality questionnaire is provided to users. The method then proceeds to the next block 410, at which stage, one or more operations of the method 400 assign a personality class to the user profile based on the responses received from users. The method 400 then proceeds to the next block 412, at which stage, one or more operations of the method 400 generate a career profile based on the responses.

Figure 5:
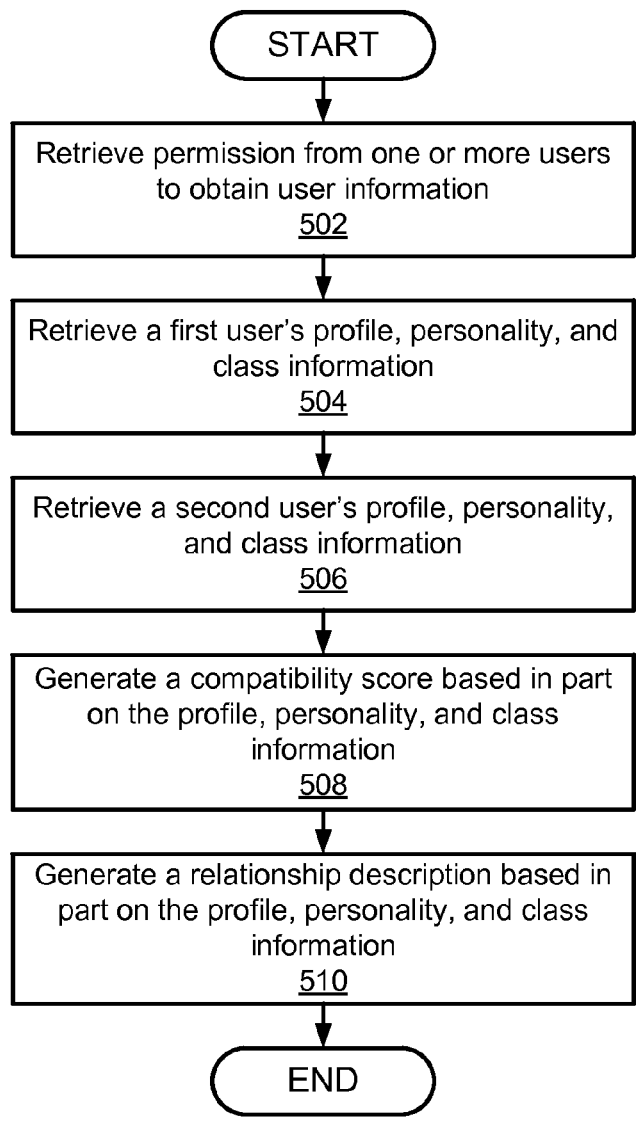
FIG. 5 is a flowchart of an example method for generating a relationship profile.

FIG. 5 is a flow chart illustrating an example of a general method 500 for generating a relationship profile. It should be understood that the order of the steps in FIG. 5 is merely by way of example and may be performed in different orders than those that are illustrated and some steps may be excluded, and different combinations of the steps may be performed. In the method 500 that is illustrated, one or more operations of the method 500 begin with retrieving permission from one or more users to obtain user information, as illustrated by block 502. The method 500 proceeds to the next block 504, at which stage, one or more operations of the method 500 retrieve a first user's profile, personality, and class information. The method 500 then proceeds to the next block 506, at which stage, one or more operations of the method 500 retrieve a second user's profile, personality, and class information. The method 500 then proceeds to the next block 508, at which stage, one or more operations of the method 500 generate a compatibility score based in part on the profile, personality, and class information. The method 500 then proceeds to the next block 510, at which stage, one or more operations of the method 500 generate a relationship description based in part on the profile, personality, and class information.

Figure 6:
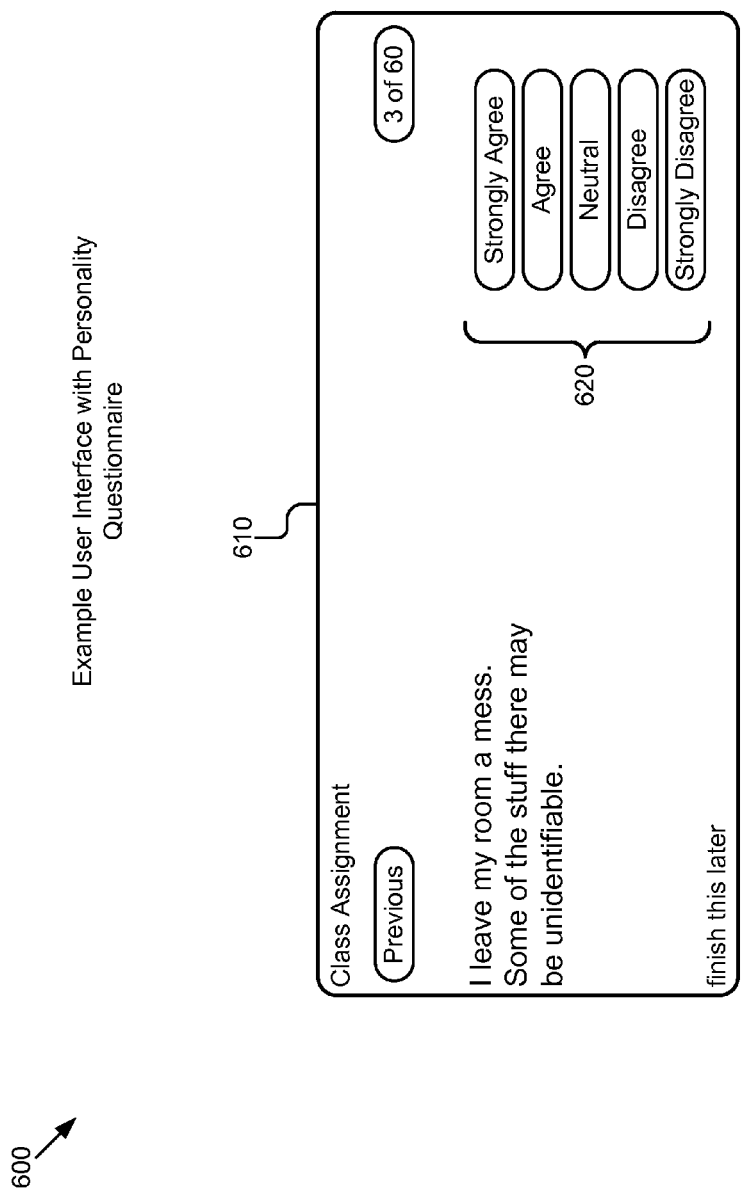
FIG. 6 is a graphic representation of an example user interface with a character or personality questionnaire (or survey).

FIG. 6 is a graphic representation of an example user interface with a personality questionnaire. The example user interface 600 includes a personality questionnaire 610, which includes an example question for determining a user's personality type. In this particular example, the example question may be used to identify the "cleanliness" of the user to whom the questionnaire is presented. The example question makes a statement "I leave my room a mess. Some of the stuff there may be unidentifiable." The user interface may present various answer choices, as indicated by reference numeral 620, via buttons, icons, or other visual display options, for example, "Strongly Agree," "Agree," "Neutral," "Disagree," "Strongly Disagree." The user may select to what extent he or she agrees or disagrees with the statement, by selecting one of the answer choices 620.

Another example sample question in the questionnaire designed to provide an insight into or test a user's personality may indicate: "I feel comfortable with myself," with providing multiple choice answers that include "Strongly Agree," "Agree," "Neutral," "Disagree," and "Strongly Disagree." After the test is administered, a numerical score is assigned to each personality variable.

Figure 7:
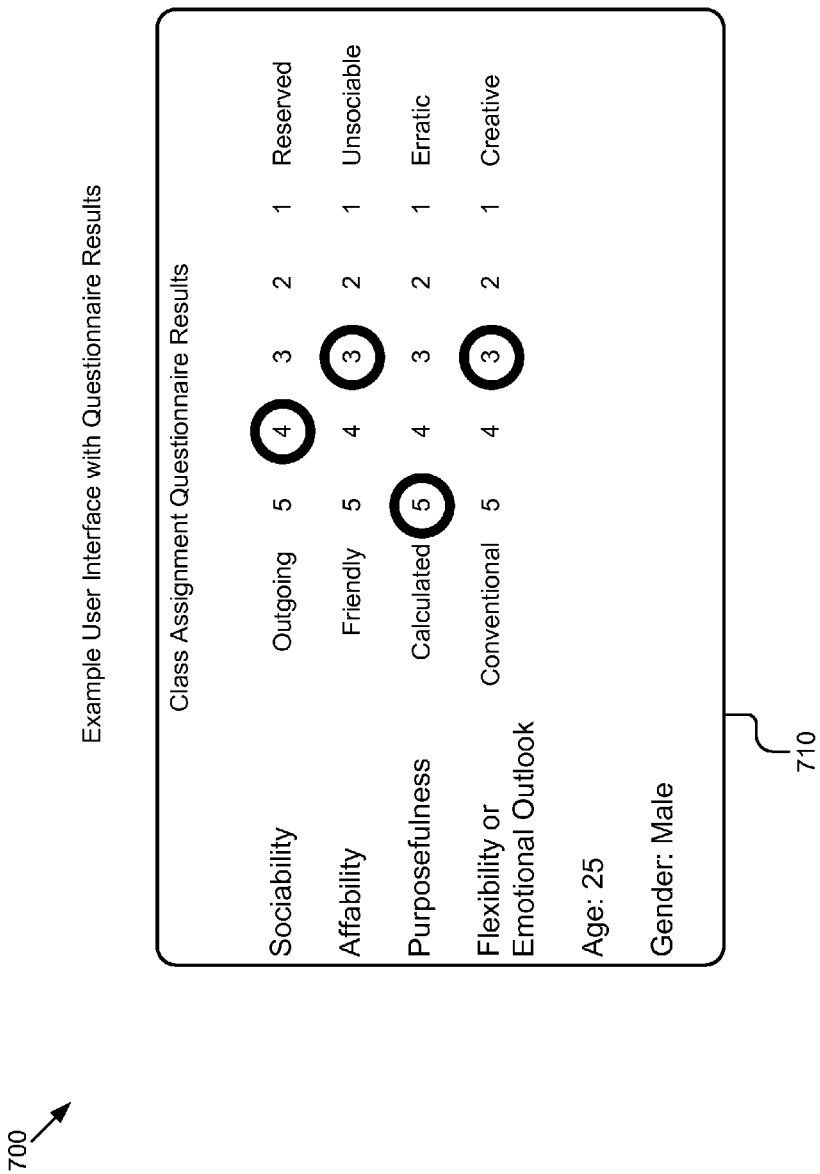
FIG. 7 is a graphic representation of an example user interface with the results of a character or personality questionnaire.

FIG. 7 is a graphic representation of an example user interface presenting the results of a personality questionnaire. The example user interface 700 indicates personality questionnaire results 710, which include one or more personality categories, corresponding scores, age, and gender. In this particular example, there are five personality categories: "Sociability," "Affability," "Purposefulness," and "Flexibility or Emotional Outlook." There are many more examples of personality categories or types that may be used. For the category "Sociability," a personality type may vary from "Outgoing" to "Reserved." Variations may be indicated by scores ranging from the number '5' to indicate "Outgoing" to the number '1' to indicate "Reserved." In the illustrated example, a particular user has a score of '4' to indicate that he is quite outgoing.

For the category "Affability," a personality type may vary from "Friendly" to "Unsociable." Variations may be indicated by scores ranging from the number '5' to indicate "Friendly" to the number '1' to indicate "Unsociable." In the illustrated example, a particular user has a score of '3' to indicate that he or she is in the middle of the spectrum for this personality type. For the category "Purposefulness," a personality type may vary from "Calculated" to "Erratic." Variations may be indicated by scores ranging from the number '5' to indicate "Calculated" to the number '1' to indicate "Erratic." In the illustrated example, a particular user has a score of '5' to indicate that he or she is very calculated. For the category "Flexibility or Emotional Outlook," a personality type may vary from "Conventional" to "Creative." Variations may be indicated by scores ranging from the number '5' to indicate "Conventional" to the number '1' to indicate "Creative." In the illustrated example, a particular user has a score of '3' to indicate that he or she falls in the middle of the spectrum. The user interface 710 also illustrates the age and gender of the user, in this instance that the age is '25' and the gender is "Male."

Figure 8:
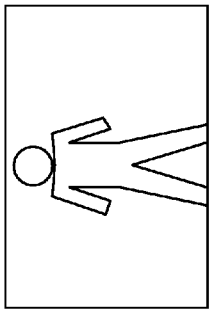
FIG. 8 is a graphic representation of an example user interface with a career profile.

FIG. 8 is a graphic representation of an example user interface presenting an example career profile. The example user interface 800 presents for visual display a career profile indicated generally by reference numeral 810, which may include career prospects, a profile image, personality trait descriptions, and a description of an ideal working environment. In this example, the career prospects include three categories: business, community & social services, and law. Each category includes a list of potential careers based on the results from the personality questionnaire. As some examples, business career prospects include an investment broker, management, consultant, politician, executive/senior management, executive coach/trainer, economic analyst, human resources director, corporate communication specialist, program designer, marketing/sales, labor relations manager, entrepreneur, and meeting facilitator. As some examples, community and social services career prospects include a psychologist, a non-profit executive, social worker, fund-raiser, and recreation director. As some examples, law career prospects include an attorney, specializing in either litigation, corporate, or family law. The career profile also indicates to a user that his or her career profile as generated as part of the personality test and that the user has requested that the career profile should be make private. The career profile may include a listing of the personality variables or traits, indicating that this particular user is "Enthusiastic," "Decisive," "Innovative," "Competitive," and "Impulsive." The career profile indicates that an ideal working environment would be one that is fast-paced and competitive and provides a challenging environment. The career profile may be used to assist a user in searching for a suitable career.

The classes may also be configured to provide important "key" career concepts and a list of possible career/jobs that have been categorized by career area. As examples, key concepts may include aspects of personality, for example, "Outgoing," "Enthusiastic," "Friendly," "Confident," and "Literal." An indication or preference of the work day may be described, for example, "to work in a friendly, fast-paced environment, which provides practical, hands-on direct services to a variety of people." An indication or preference of the atmosphere may be described, for example, an atmosphere that presents opportunities to create meaningful, ongoing relationships; leading projects that collaboratively resolve problems.

The classes may provide career and field recommendations, for example, in business, some examples may be "Office Manager," "Real Estate Agent," "Sales Representative (of tangible products)," "Public Relations Specialist," "Customer Service Representative," "Personal Banker," "Labor Relations Mediator," and "Special Events Producer." As another example, in education, some examples of categories may be "Teacher," "Home Economics," "Elementary School," etc. In science/medical, categories may include: "Family Physician," "Dental/Medical Assistant," "Exercise Physiologist," "Emergency Room Nurse" etc. In a creative field, some examples of categories may be "Film Producer," "Musician," "Performer," etc.

Figure 9:
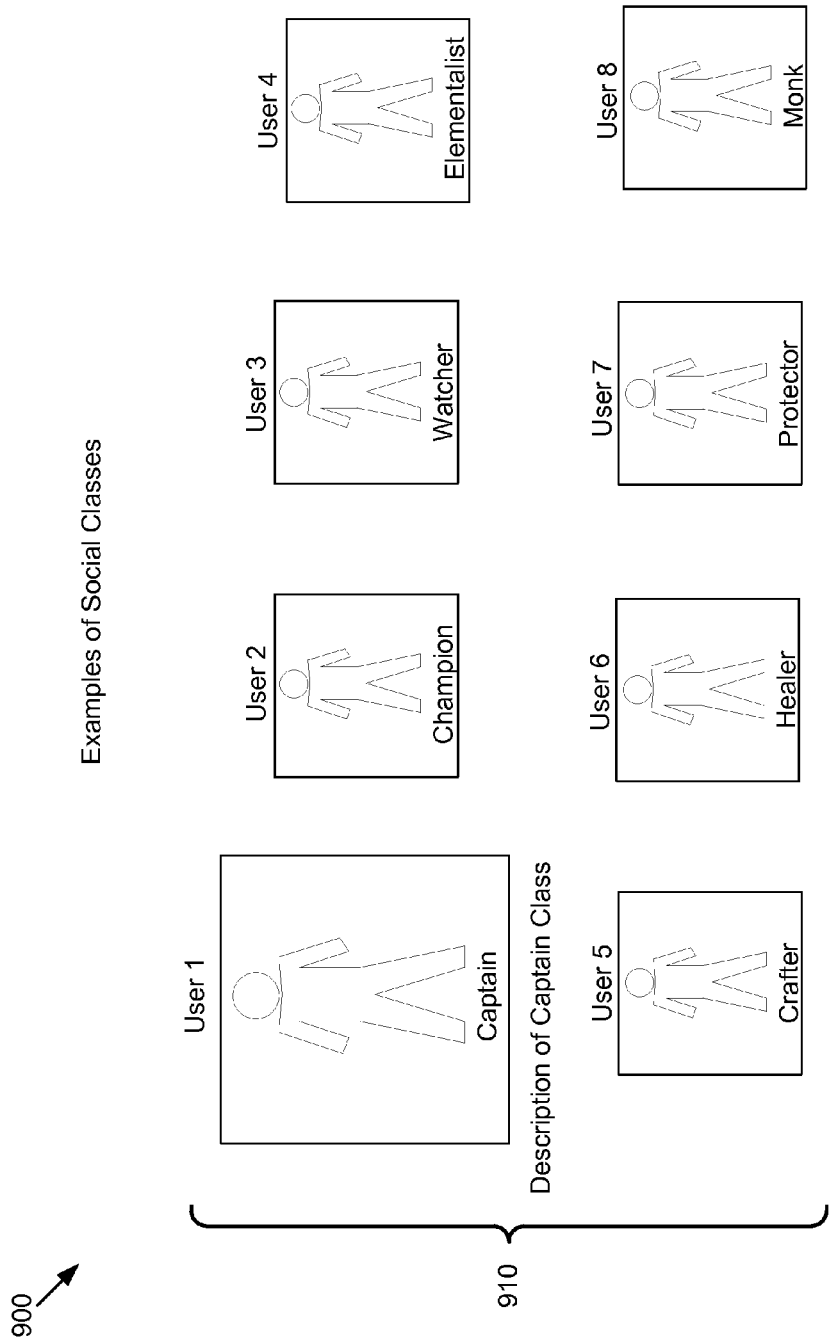
FIG. 9 is a graphic representation of an example user interface with examples of social classes.

FIG. 9 is a graphic representation of an example user interface with examples of social classes. The example user interface 900 includes one or more examples of social classes indicated generally by reference numeral 910, each of which may include a visual display of a user image and a class description. This example illustrates eight users and their corresponding social classes: User 1 is a "Captain," User 2 is a "Champion," User 3 is a "Watcher," User 4 is a "Elementalist," User 5 is a "Crafter," User 6 is a "Healer," User 7 is a "Protector," and User 8 is a "Monk." In some embodiments, each class may include a description of the particular class.

Figure 10:
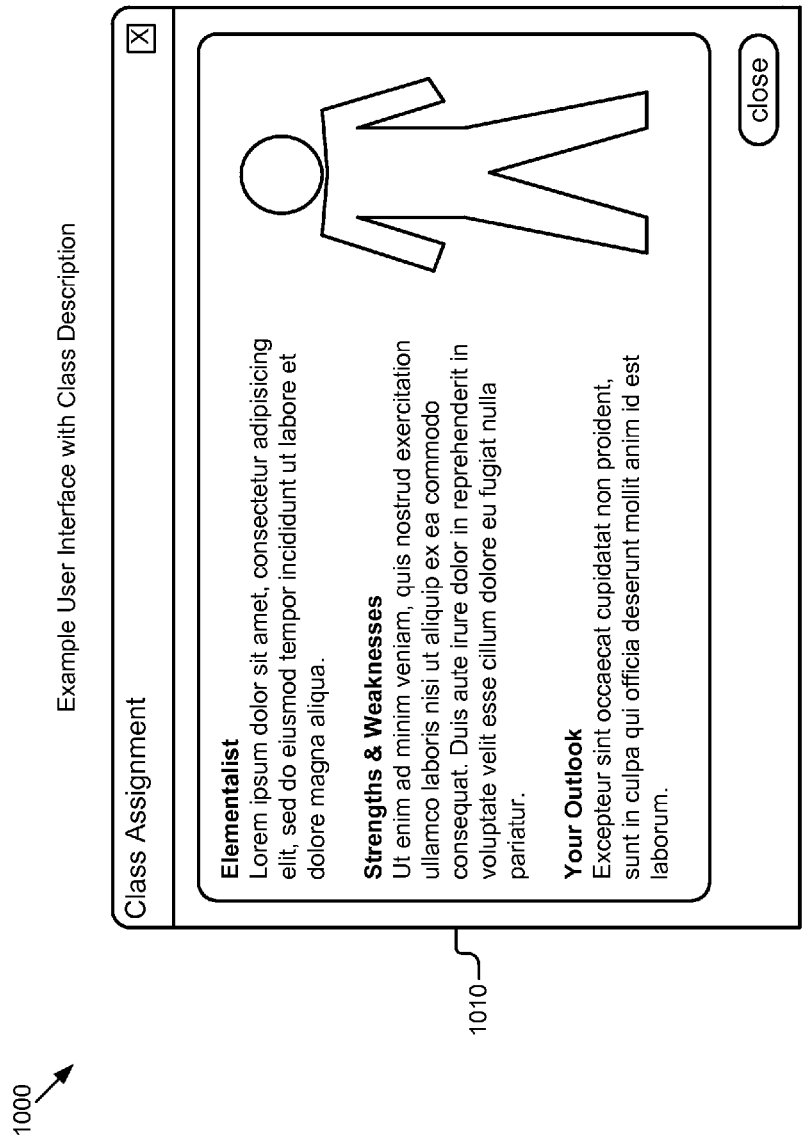
FIG. 10 is a graphic representation of an example user interface with a class description.

FIG. 10 is a graphic representation of an example user interface illustrating a class description. The example user interface 1000 includes a class description 1010, which includes descriptions of a summary, strengths & weaknesses, and a user's outlook generated based on the personality questionnaire results. In the example, illustrated, a particular user's class (for example, user 4) is indicated as "Elementalist." The strengths and weaknesses for this class are indicated as well as a description of the outlook. For example, the detailed class description may provide information on a user's personality, behavior, character etc. An one example, the class description for the class designation "Captain," which is assigned to user 1 (FIG. 9) may be as follows:

"Captains don't hold that rank in any organization so much as just having the status, attitude, and style that goes with it. In other words, they have a real command of leadership, inspiration, and desire to live life to the fullest. They are open, energetic, and positive, attracting others to join in, because of their contagious spirit. Often admired and emulated for their accomplishments, they are also known for being creative and caring. They are generous, sociable, and like a good laugh, but 'Captains' are still able to set and focus on goals. In fact, they often appear to be on top of the world. This can be energizing to those around them, although some may find it hard to take them in large doses. Some may even view 'Captains' as too perfect, but as long as they remember to manage this perceptions carefully, they may actually end up on top of the world after all. With so many strong attributes, their biggest challenge may be just keeping it all in balance and not letting any one aspect of their character dominate at the expense of other aspects. Because, if there ever was a group whose biggest flaw was not having many flaws, it might indeed be the 'Captains'."

Figure 11:
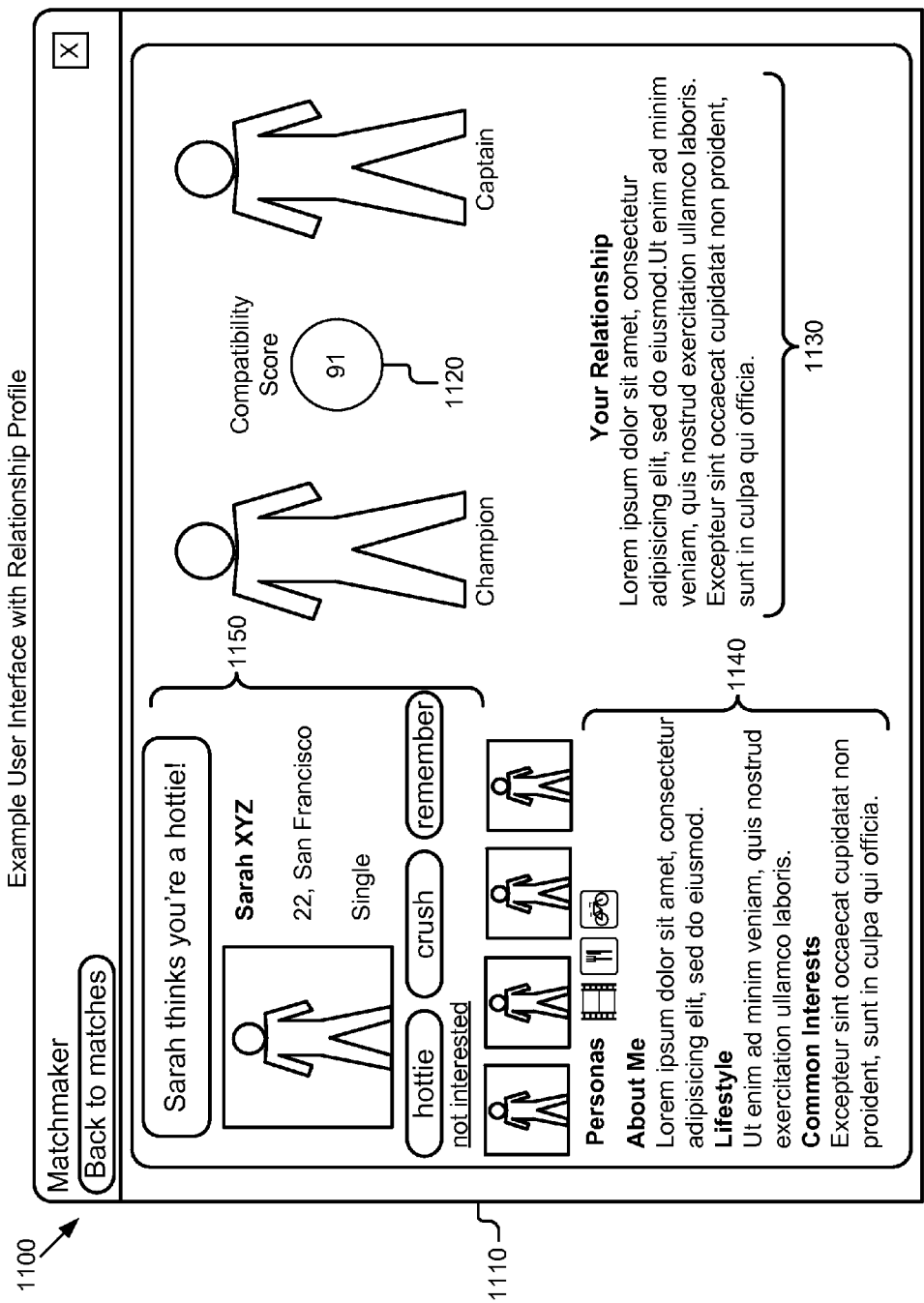
FIG. 11 is a graphic representation of an example user interface with a relationship profile.

FIG. 11 is a graphic representation of an example user interface indicating a relationship profile for a particular user. The example user interface 1100 includes a relationship profile 1110, which includes a compatibility score 1120, a relationship description (for example, prediction) 1130, user information 1140, and a potential partner 1150. This information is generated based on one or more of the personality questionnaire, the personality questionnaire responses, and the user information. The example that is illustrated is for a particular user, Sarah XYZ, who is a single young women of '22' years, who lives in San Francisco. Her relationship profile may indicate a description about Sarah, aspects of her lifestyle, and common interests.

It should recognized that user properties or characteristics, for example, the gender, location, race, and age may affect the class assignment, as human personality matures and changes over time, and may be affected by the attributes and the environment. In addition, class names may be modern or traditional role playing classes is games (for example, "Lord," "Monk," "Knight," "Mage," "Scholar," "Druid," "Bard," "Shepherd," "Paladin," "Ranger," "Healer," Builder, Visionary, Bishop, Rogue, Tinker), comic character inspired classes (e.g., Champion, "Mentalist," "Protector," "Enchanter," "Visionary," "Crafter," "Crusader") or any such fictional names.

In some implementations, the classes may incorporate a skill tree system that incorporates more specific skills, which enhance the properties of a particular class. For example, a skill level may be improved with use (for example, a user who sends a lot of messages may increase his or her messenger skill) or study (for example, a user's browsing pattern or action may identify interests and proficiencies). These skills may be primary or secondary skills.

In some implementations, classes may also be formulated based on professions or careers that indicate aptitude, for example, social skills, knowledge, scientific skills, crafty and mechanical skills, artistic skills, or medical skills etc.

Classes may be used for analysis of network and user trends as well as prediction and advertisement targeting. The classes may be used to come up with recommendations for friends, activity partners, business networking, and romantic matches in a network.

For example, as illustrated in FIG. 11, the system and methods may consider the classes of two users, and generate a compatibility indication, based on their classes or additional attributes (for example, profiles, network, location, or actions).

A sample report may be generated for the two users, for example, to indicate their relationship potential. As one example, a sample report may indicate aspects to assess the relationship potential. For example, it may indicate to two particular users that, "as individuals and as a couple you are creative, flexible, and open to new ideas and experiences. Perhaps what brought you together was a common interest in the arts, or other cultural or intellectual pursuits. You love to explore ideas and seek different perspectives together. You both take a deep interest in the people and world around you. It is likely that travel and other type of exploration play an important role in your relationship. Where social and political issues are concerned, you both are more likely to have liberal or moderate attitudes. Even though you may not be the type to march down the street waving banners, you are likely to be involved in, or moved by, political or social action on some level. Due to your open-mindedness, it is possible that you don't observe traditional rules regarding relationships. Your relationship may have more flexible boundaries than most, and you will both be more creative about how you view your relationship between the two of you, as well as between yourselves and others."

The sample report may have a section for relationships entitled "Starting Out," which may indicate to two particular users that "you are each attracted by the other's creativity and imagination, and you will probably start your relationship with great enthusiasm and high expectations. Your worldviews are not necessarily similar but because of your mutual openness to other viewpoints, you feel a strong sense of camaraderie and companionship with one another from the start. You may both take comfort in the fact that the other accepting of your differences. Initially, you may be caught up in spiraling whirlwind of excitement. It seems you have unlimited potential as you share so many interests—the world with all its possibilities awaits the two of you. You may begin fantasizing or making plans for the future early on, as you are filled with enthusiasm for the potential this relationship seems to offer. You look forward to sharing your adventures together.

The sample report may have a section to assess the high points of a relationship, which indicates that "since you are both open to new experiences, you won't run out of fun and exciting things to do and explore together. When you are not doing, you will enjoy planning and fantasizing together. You may be involved together in creative projects involving the arts, education, or other creative intellectual endeavors. You are capable of looking deeply into yourselves and your relationship, and this ability can bring you very close emotionally. Together you are able to view situations from a variety of perspectives, so you can be creative in seeking solutions to your problems. You may be skilled at helping others solve their problems as well. You may both enjoy being untraditional and challenging the status quo. You may do this through political activism or by choosing a lifestyle that doesn't conform to the norm. There may be subtle differences in the way you lead your lives, slight but significant differences, in thinking from the status quo, and other aspects of your life together that will separate you from the average couple. You may even receive criticism from family or others for your unconventional beliefs or actions. But this outside opposition is more likely to make your bond stronger, as you are both probably used to being viewed as unique individuals.

As another example, the sample report may have a section entitled "Points of Conflict," which may indicate to two particular users that "because each of you is likely to be interested in many ideas and events outside of the relationship, you risk drifting apart if you become too deeply immersed in your own particular pursuits. You also risk spreading yourselves too thin. There are only twenty-four hours in a day. And you may forget to use some of them for nurturing your relationship or just resting or relaxing. Because of your active intellects, you may have a tendency toward over-analysis. You may actually be too creative at solving problems, and begin to imagine trouble where it doesn't exist. You may also over investigate options when making decisions that can be made faster with less concern for those options than you make think. Additionally, unless your enthusiasms are balanced by a strong sense of practicality, you make have difficulty focusing on mundane, day-to-day matters, such as balancing the checkbook and checking the oil in your car. If both of you are very much like this, it may get you both in trouble. You risk encouraging this type of behavior in each other. Your liberal ideas regarding relationships may put your own in peril. If you have an "open" relationship in which you are both able to be involved with others, you may find that the stress of these involvements brings your relationship close to the breaking point. But even if you are not this extreme, the openness that you have toward other people, and both your needs for variety, may translate into temptation, when things in your relationship become more hum drum as they tend to over time in all relationships."

Yet another section in the relationship report may consider compatibility of two users to work together and may indicate "if you maintain your common interests, you will have many opportunities to spend time together, live out your dreams, and strengthen your bonds. If you feel you are becoming less connected, you may need to make more effort to include each other in your respective worlds. Make a point of insisting on interesting activities that you share in common and spend time together on. This will ensure that you do not drift apart. Be careful not to over-analyze your relationship. Use your creativity to find viable solutions to your problems, but be sure you are not creating problems where none exist. Even though you are both very intelligent and flexible, you will undoubtedly have areas of disagreement. You may need to develop skills in negotiation and learn to be more accommodating toward one another. When you are making other decisions together, such as purchasing a big item like a car, be thorough, but do not let your mutual tendency to look at things from all angles keep you from making a decision. As mentioned before, there is the possibility that (for one or both of you), your unconventionality extends to your ideas of relationship and commitment. Very few relationships can endure if one or both partners are involved in outside intimate relationships. If this is the case and you want this relationship to last, you may need to clarify your values and set your priorities with regard to the importance of this relationship. And even if this is an extreme category that you feel you do not fall into, be aware that this can still be an area where you can potentially get into trouble. There are many mundane tasks that we all have to do in the normal course of life. The fact that you can work together on such tasks or divide up the work can make the boring tasks more bearable than if you were each alone. Rather than putting everyday tasks off, leverage your relationship to get them done and have more time together for the creative, exciting, and original things you love to do."

Yet another section in the sample report on relationships may indicate the potential for two particular users of their compatibility potential "Down the Road," indicating that, "your relationship has great potential to remain fresh and exciting, because each of you will bring new ideas and interests to it. Make sure you share these ideas and interests with your partner and do not get completely caught up in activities that exclude the other. Be sure to stay open to each other and focus on keeping your relationship strong by taking time to focus on mutual areas of interest. On the other hand, you may need to beware of boredom. You may both have a tendency to slip into apathy if you are not stimulated by new situations or ideas. Keeping the creative juices flowing will yield a relationship of emotional and intellectual bounty. It can be fun to look for new and stimulating activities and interests together."

In the preceding description, for purposes of explanation, numerous specific details are indicated in order to provide a thorough understanding of the technology described. It should be apparent, however, that this technology can be practiced without these specific details. In other instances, structures and devices are shown in block diagram form in order to avoid obscuring the technology. For example, the present technology is described with some embodiments above with reference to user interfaces and particular hardware. However, the present technology applies to any type of computing device that can receive data and commands, and any devices providing services. Moreover, the present technology is described above primarily in the context of providing support for assigning personality classes to user profiles; however, the present technology applies to any type of class and can be used for other applications beyond social networking. In particular, this technology for assigning personality classes may be used in other contexts besides social networking.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions described above are presented in terms of algorithms and symbolic representations of operations on data bits within a computer memory of either one or more computing devices. These algorithmic descriptions and representations are the means to most effectively convey the substance of their work. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the preceding discussion, it should be appreciated that throughout the description, discussions utilizing terms for example "processing," "computing," "calculating," "determining," or "displaying" or the like, refer to the action and processes of a computer system, or similar electronic computing device, that manipulate and transform data represented as physical (electronic) quantities within the computer system's registers and memories, into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment including both hardware and software components. In some embodiments, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to any particular programming language. It should be understood that a variety of programming languages may be used to implement the technology as described here.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method executed on one or more computing devices, comprising:
    determining, by at least one of the one or more computing devices, a personality characteristic of a user profile associated with a user within an online community, wherein the personality characteristic is determined from at least one of multiple sources;
    assigning, by at least one of the one or more computing devices, a class to the user profile, based at least in part on, the personality characteristic and incorporating in the class one or more specific skills and a skill level of the user;
    generating, by at least one of the one or more computing devices, a class description for the class assigned to the user profile;
    generating, by at least one of the one or more computing devices, a career profile associated with the user profile to designate at least a career prospect, personality information and an ideal working environment description, based at least in part on, the class assigned to the user profile;
    generating, by at least one of the one or more computing devices, a relationship profile associated with the user profile for at least two users, based at least in part on, the class assigned to the user profile associated with each of the two users, the relationship profile including a compatibility score, a relationship description, and a list of common interests; and
    generating, by at least one of the one or more computing devices, user data including the class description and a report with the career profile and the relationship profile capable of being displayed in one or more user interfaces.

2. A computer-implemented method executed on one or more computing devices, the method comprising:
    determining, by at least one of the one or more computing devices, a personality characteristic of a user profile associated with a user within an online community, from one or more sources;
    assigning, by at least one of the one or more computing devices, a class to the user profile, based at least in part on, the personality characteristic of the user profile and incorporating in the class one or more specific skills and a skill level of the user;
    generating, by at least one of the one or more computing devices, a class description of the class, based at least in part on, the personality characteristic and the skill level;
    generating, by at least one of the one or more computing devices, a career profile for the user to designate at least a career prospect, personality information and an ideal working environment description, based at least in part on, the class assigned to the user profile;
    generating, by at least one of the one or more computing devices, a relationship profile associated with the user profile for at least two users, based at least in part on, the class assigned to the user profile associated with each of the two users, the relationship profile including a compatibility score, a relationship description, and a list of common interests; and
    providing, by at least one of the one or more computing devices, data including the class description and the career profile to at least certain user interfaces for display and data including the class description and the relationship profile to at least certain other user interfaces for display.

3. The computer-implemented method according to claim 2, wherein the one or more sources include a personality questionnaire provided to the user and the class assigned to the user profile associated with the user is based at least in part on, responses obtained from the user.

4. The computer-implemented method according to claim 2,
wherein the skill level reflects improvement by further use and study with respect to the one or more specific skills, which enhance the properties of the class; and
wherein assigning the class to the user profile is based at least in part on the skill level.

5. The computer-implemented method according to claim 2,
wherein the relationship profile for at least two users is generated, based at least in part on, responses obtained from the at least two users.

6. The computer-implemented method according to claim 5, wherein the relationship profile includes the compatibility score for the at least two users and the class and one or more additional attributes of the two users is used to further provide compatibility indications in reports generated for the two users.

7. The computer-implemented method according to claim 5, wherein the the relationship description is based at least in part on the user profile, personality and class information for a particular user.

8. The computer-implemented method according to claim 5, wherein the relationship profile includes the list of common interests for the at least two users and the common interests are indicated in relation to compatibility of two users to work together.

9. The computer-implemented method according to claim 2, further comprising:
generating a personality score for one or more personality variables relating to the personality characteristic.

10. The computer-implemented method according to claim 2, wherein the class is selected from a predetermined number of classes.

11. A system, comprising:
a processor; and
a memory, wherein the processor and memory are communicatively coupled and further comprise:
a personality questionnaire module configured to determine a personality characteristic for one or more users of an online community from one or more sources;
a class assignment module configured to assign a class to the one or more users, based at least in part on, the personality characteristic and incorporating in the class one or more specific skills and a skill level of the user;
a class description module configured to generate a class description, based at least in part on, the class assigned to the one or more users;
a career profile module configured to generate a career profile for the one or more users to designate at least a career prospect, personality information and an ideal working environment description, based at least in part on, the class assigned to the one or more users;
a relationship profile module configured to generate a relationship profile associated with the user profile for at least two users, based at least in part on, the class assigned to the user profile associated with each of the two users, the relationship profile including a compatibility score, a relationship description, and a list of common interests; and
a user interface module configured to provide data including the class description and the career profile to certain user interfaces for display and data including the class description and the relationship profile to certain other users for display.

12. The system according to claim 11, wherein the one or more sources include a personality questionnaire provided to the one or more users to obtain responses.

13. The system according to claim 11,
wherein the skill level reflects improvement by further use and study with respect to the one or more specific skills, which enhance properties of the class.

14. The system according to claim 13, wherein assigning the class to the one or more users is based at least in part on the determined level.

15. The system according to claim 13, wherein the one or more sources include at least one of user actions and user connections of the one or more users in the online community.

16. The system according to claim 11:
wherein the relationship profile module is configured to generate the compatibility score based on similarities among questionnaire answers by users and other information.

17. The system according to claim 16, wherein the compatibility scoring and the class and one or more additional attributes of the two users is used to further provide compatibility indications in reports generated for the two users.

18. The system according to claim 16, wherein the relationship description is based at least in part on the user profile, personality and class information for a particular user.

19. The system according to claim 16, wherein the common interests of the at least two of the one or more users are indicated in relation to compatibility of two users to work together.

20. The system according to claim 11, wherein the personality questionnaire module is further configured to generate a personality score for one or more personality variables, based at least in part on, responses obtained from the one or more users.

* * * * *